US010160555B2

(12) United States Patent
Turse et al.

(10) Patent No.: US 10,160,555 B2
(45) Date of Patent: Dec. 25, 2018

(54) MULTIPLE BOOM DEPLOYMENT

(71) Applicant: Composite Technology Development, Inc., Lafayette, CO (US)

(72) Inventors: Dana Turse, Broomfield, CO (US); Larry Adams, Thornton, CO (US); Doug Richardson, Westminster, CO (US)

(73) Assignee: COMPOSITE TECHNOLOGY DEVELOPMENT, INC., Lafayette, CO (US)

(*) Notice: Subject to any disclaimer, the term of this patent is extended or adjusted under 35 U.S.C. 154(b) by 354 days.

(21) Appl. No.: 15/136,487

(22) Filed: Apr. 22, 2016

(65) Prior Publication Data

US 2016/0311558 A1 Oct. 27, 2016

Related U.S. Application Data

(60) Provisional application No. 62/150,965, filed on Apr. 22, 2015.

(51) Int. Cl.
*B64G 1/22* (2006.01)
*B64G 1/66* (2006.01)
*B64G 1/34* (2006.01)
*B64G 1/40* (2006.01)
*B64G 1/44* (2006.01)

(52) U.S. Cl.
CPC ............... *B64G 1/222* (2013.01); *B64G 1/34* (2013.01); *B64G 1/407* (2013.01); *B64G 1/44* (2013.01); *B64G 1/66* (2013.01)

(58) Field of Classification Search
CPC ......... B64G 1/222; B64G 1/34; B64G 1/407; B64G 1/44; B64G 1/66
See application file for complete search history.

(56) References Cited

U.S. PATENT DOCUMENTS

| 3,144,104 | A | * | 8/1964 | Weir | E04C 3/005 |
| | | | | | 182/41 |
| 3,300,910 | A | * | 1/1967 | Isaac | B64C 27/50 |
| | | | | | 137/355.26 |
| 3,387,414 | A | * | 6/1968 | Adams | E04C 3/005 |
| | | | | | 206/216 |
| 3,499,610 | A | * | 3/1970 | Hamlin | B64G 9/00 |
| | | | | | 138/166 |
| 3,508,587 | A | * | 4/1970 | Mauch | F16L 11/121 |
| | | | | | 138/119 |

(Continued)

*Primary Examiner* — Medhat Badawi

(57) ABSTRACT

Some embodiments of the invention include a boom deployment system. The boom deployment system, for example, may include a housing, a spool, a first boom, and a second boom. The spool may be disposed within the housing and configured to rotate around an axis that is fixed relative to the housing. The first boom and/or the second boom may have a cylindrical shape in a deployed configuration, a flattened shape in a stowed configuration, and a slit that extends along the longitudinal length of the boom in the deployed configuration. The first boom and/or the second boom may be stowed in the stowed configuration flattened and wrapped around the spool. The first boom and/or the second boom may transition from the stowed configuration to the deployed configuration as the spool rotates around the axis.

12 Claims, 22 Drawing Sheets

(56) References Cited

U.S. PATENT DOCUMENTS

| | | | | |
|---|---|---|---|---|
| 3,589,632 A * | 6/1971 | Rew | B21C 47/003 | 188/82.84 |
| 3,608,844 A * | 9/1971 | Tumulty, Jr. | B21C 47/18 | 242/373 |
| 3,735,943 A * | 5/1973 | Fayet | B64G 1/222 | 136/245 |
| 4,018,397 A * | 4/1977 | Rusch | B21C 37/10 | 242/388.6 |
| 4,225,871 A * | 9/1980 | Ramari | H01Q 1/087 | 343/877 |
| 4,265,690 A * | 5/1981 | Lowenhar | H01P 3/00 | 156/148 |
| 4,991,784 A * | 2/1991 | Schmid | B64G 9/00 | 242/390.3 |
| 5,235,788 A * | 8/1993 | Maimets | B64G 4/00 | 244/172.6 |
| 6,217,975 B1 * | 4/2001 | Daton-Lovett | B29C 61/0608 | 156/161 |
| 6,256,938 B1 * | 7/2001 | Daton-Lovett | F16H 19/064 | 138/119 |
| 6,343,442 B1 * | 2/2002 | Marks | B64G 1/222 | 244/172.6 |
| 6,508,036 B1 * | 1/2003 | Cadogan | B64G 1/222 | 52/108 |
| 7,806,370 B2 * | 10/2010 | Beidleman | B64G 1/222 | 136/245 |
| 8,683,755 B1 * | 4/2014 | Spence | B64G 1/222 | 136/245 |
| 8,893,442 B1 * | 11/2014 | Spence | E04O 3/005 | 52/108 |
| 8,894,017 B1 * | 11/2014 | Baghdasarian | B64G 1/443 | 136/245 |
| 9,156,568 B1 * | 10/2015 | Spence | B64G 1/44 | |
| 9,528,264 B2 * | 12/2016 | Freebury | E04O 3/005 | |
| 9,580,190 B1 * | 2/2017 | Spence | B64G 1/222 | |
| 9,611,056 B1 * | 4/2017 | Spence | B64G 1/443 | |
| 2010/0187364 A1 * | 7/2010 | Kutter | B64G 1/1078 | 244/171.7 |
| 2010/0187365 A1 * | 7/2010 | Kutter | B64G 1/1078 | 244/171.7 |
| 2011/0204186 A1 * | 8/2011 | Keller | B64G 1/222 | 244/172.6 |
| 2011/0210209 A1 * | 9/2011 | Taylor | B64G 1/222 | 244/172.6 |
| 2012/0012154 A1 * | 1/2012 | Keller | B64G 1/222 | 136/245 |
| 2012/0090660 A1 * | 4/2012 | Keller | B64G 1/222 | 136/245 |
| 2013/0061541 A1 * | 3/2013 | Taylor | B29C 67/0014 | 52/108 |
| 2013/0186011 A1 * | 7/2013 | Keller | E04H 12/00 | 52/108 |
| 2014/0123575 A1 * | 5/2014 | Bobbio | E04H 12/185 | 52/108 |
| 2014/0230949 A1 * | 8/2014 | Daton-Lovett | B64G 1/222 | 138/177 |
| 2015/0144740 A1 * | 5/2015 | Turse | B64G 1/44 | 244/172.6 |
| 2015/0259911 A1 * | 9/2015 | Freebury | E04O 3/005 | 52/108 |
| 2015/0284955 A1 * | 10/2015 | Adams | E04O 3/005 | 52/108 |
| 2015/0368903 A1 * | 12/2015 | Turse | B65H 75/4402 | 242/407 |
| 2016/0032609 A1 * | 2/2016 | Kucinski | B21C 37/0818 | 52/108 |
| 2016/0137319 A1 * | 5/2016 | Steele | B64G 1/443 | 52/745.2 |
| 2016/0332752 A1 * | 11/2016 | Abrams | B64G 1/222 | |
| 2017/0158357 A1 * | 6/2017 | Hart, III | B64G 1/222 | |
| 2017/0297749 A1 * | 10/2017 | Steele | B64G 1/44 | |
| 2017/0298628 A1 * | 10/2017 | Rakow | B64G 1/222 | |
| 2018/0111703 A1 * | 4/2018 | Hensley | B64G 1/222 | |

* cited by examiner

MULTIPLE BOOM DEPLOYMENT

GOVERNMENT RIGHTS

This invention was made with government support under contract number NNX15CG38P awarded by the National Aeronautics and Space Administration (NASA). The government has certain rights in the invention.

CROSS-REFERENCE TO RELATED APPLICATION

This application is a non-provisional of U.S. Provisional Patent Application No. 62/150,965, filed Apr. 22, 2015, titled MULTIPLE BOOM DEPLOYMENT.

SUMMARY

Some embodiments of the invention include a multi-boom deployment device that includes a first spool, a first boom, a second boom, a third boom, and a fourth boom. The first boom having a cylindrical shape in a deployed configuration, a flattened shape in a stowed configuration, and a slit that extends along the longitudinal length of the first boom in the deployed configuration. In some embodiments, the first boom is stowed in the stowed configuration flattened and wrapped around the first spool. The second boom having a cylindrical shape in a deployed configuration, a flattened shape in a stowed configuration, and a slit that extends along the longitudinal length of the second boom in the deployed configuration. In some embodiments, the second boom is stowed in the stowed configuration flattened and wrapped around the first spool. The third boom having a cylindrical shape in a deployed configuration, a flattened shape in a stowed configuration, and a slit that extends along the longitudinal length of the third boom in the deployed configuration. In some embodiments, the third boom is stowed in the stowed configuration flattened and wrapped around the first spool. The fourth boom having a cylindrical shape in a deployed configuration, a flattened shape in a stowed configuration, and a slit that extends along the longitudinal length of the fourth boom in the deployed configuration. In some embodiments, the fourth boom is stowed in the stowed configuration flattened and wrapped around the first spool.

In some embodiments, the multi-boom deployment device may include a housing within which the first spool, the first boom, the second boom, the third boom, and the fourth boom are disposed in the stowed the stowed configuration.

In some embodiments, the multi-boom deployment device may include a housing having an aperture through which the first boom extends in the deployed configuration.

In some embodiments, the multi-boom deployment device may include a restraint mechanism configured to cover the aperture in the stowed configuration and open in the deployed configuration.

In some embodiments, the multi-boom deployment device may include a housing and a first root lock. In some embodiments, the first spool is disposed within the housing. In some embodiments, the first root lock may be disposed within the housing. In some embodiments, the root lock is position within the housing relative to the spool, wherein in the deployed configuration a proximal end of the first boom is wrapped around the root lock.

In some embodiments, the multi-boom deployment device may include a spring mechanism coupled with the housing and the first root lock. In some embodiments, the spring mechanism is configured to move the root lock from a location in the stowed configuration into a position near the spool in the deployed configuration.

In some embodiments, the first boom and one or more of the second boom, the third boom, and the fourth boom are substantially orthogonal in the deployed configuration.

In some embodiments, the first boom and at least one of the second boom, the third boom, and the fourth boom are substantially parallel in the deployed configuration.

In some embodiments, the first boom transitions from the stowed configuration to the deployed configuration as the spool rotates around the axis, and wherein the second boom transitions from the stowed configuration to the deployed configuration as the spool rotates around the axis.

In some embodiments, the multi-boom deployment device may include a housing, wherein the first spool is disposed within the housing; a second spool disposed within the housing; and a fifth boom having a cylindrical shape in a deployed configuration, a flattened shape in a stowed configuration, and a slit that extends along the longitudinal length of the boom in the deployed configuration, wherein the fifth boom is stowed in the stowed configuration flattened and wrapped around the second spool.

Some embodiments of the invention include a boom deployment system. The boom deployment system, for example, may include a housing, a spool, a first boom, and a second boom. The spool may be disposed within the housing and configured to rotate around an axis that is fixed relative to the housing. The first boom and/or the second boom may have a cylindrical shape in a deployed configuration, a flattened shape in a stowed configuration, and a slit that extends along the longitudinal length of the boom in the deployed configuration. The first boom and/or the second boom may be stowed in the stowed configuration flattened and wrapped around the spool. The first boom and/or the second boom may transition from the stowed configuration to the deployed configuration as the spool rotates around the axis.

In some embodiments, the boom deployment system may include a first sensor coupled with the first boom and a second sensor coupled with the second boom.

In some embodiments, the boom deployment system may include a first wire coupled with the first boom and a second wire coupled with the second boom.

In some embodiments, in the deployed configuration the first boom is substantially perpendicular with the second boom.

In some embodiments, in the deployed configuration the first boom is substantially parallel with the second boom.

In some embodiments, the housing includes a first aperture through which the first boom extends in the deployed configuration, and wherein the housing includes a second aperture through which the second boom extends in the deployed configuration.

Some embodiments may include a satellite having a housing, a first spool disposed within the housing and configured to rotate around an axis that is fixed relative to the housing; and a first boom having a cylindrical shape in a deployed configuration, a flattened shape in a stowed configuration, and a slit that extends along the longitudinal length of the first boom in the deployed configuration, wherein the first boom is stowed in the stowed configuration flattened and wrapped around the first spool, the first boom transitions from the stowed configuration to the deployed configuration as the spool rotates around the axis; a second boom having a cylindrical shape in a deployed configuration, a flattened shape in a stowed configuration, and a slit that extends along the longitudinal length of the second boom in the deployed configuration, wherein the second boom is stowed in the stowed configuration flattened and wrapped around the first spool the second boom transitions from the stowed configuration to the deployed configuration as the spool rotates around the axis; a second spool disposed within the housing and configured to rotate around an axis that is fixed relative to the housing; and a third boom having a cylindrical shape in a deployed configuration, a flattened shape in a stowed configuration, and a slit that extends along the longitudinal length of the third boom in the deployed configuration, wherein the third boom is stowed in the stowed configuration flattened and wrapped around the second spool, the third boom transitions from the stowed configuration to the deployed configuration as the second spool rotates around the axis.

In some embodiments, in the deployed configuration the third boom is substantially perpendicular with the second boom, and wherein in the deployed configuration the third boom is substantially perpendicular with the first boom.

In some embodiments, the satellite may include a first restraint mechanism configured to cover an aperture in the housing in the stowed configuration and open in the deployed configuration, wherein the third boom extends through the aperture in the deployed configuration.

In some embodiments, the satellite may include a first root plug disposed to couple with the first boom in the deployed configuration; a second root plug disposed to couple with the second boom in the deployed configuration; and a third root plug disposed to couple with the third boom in the deployed configuration.

BRIEF DESCRIPTION OF THE FIGURES

These and other features, aspects, and advantages of the present disclosure are better understood when the following Detailed Description is read with reference to the accompanying drawings.

DETAILED DESCRIPTION

Some embodiments of the invention include a multi-boom deployment device and a single-boom deployment device. Some embodiments may also include various satellite systems that include one or more multi-boom deployment devices and/or one or more single-boom deployment devices. In some embodiments, the multi-boom deployment device may include a plurality of booms that are flattened and wrapped around a spool within a housing in a stowed configuration. In some embodiments, in a deployed configuration the booms may extend away from the housing a plurality of directions. The multi-boom deployment device and/or the single-boom deployment device may be used for any number of purposes.

Some embodiments may be used for measuring electric fields, which may include the measurement of voltage potential between three pairs of electrodes separated along orthogonal axes using the booms.

In some embodiments, the satellite system may deploy two, three, four, or more booms from a single deployment mechanism or deployment drum or spool. Each boom may, for example, include a tubular longeron with a slit along the length of the longeron that may or may not include teeth on one or more sides of the longeron. In some embodiments, six booms may be deployed using as few as two or three deployment mechanisms or deployment drums or spools. In some embodiments, the longeron may be flattened and/or rolled along the longitudinal length of the longeron such as, for example, for stowage. In some embodiments, the longeron may include teeth along the length of the slit such that the teeth can join together after deployment.

Figure 1:
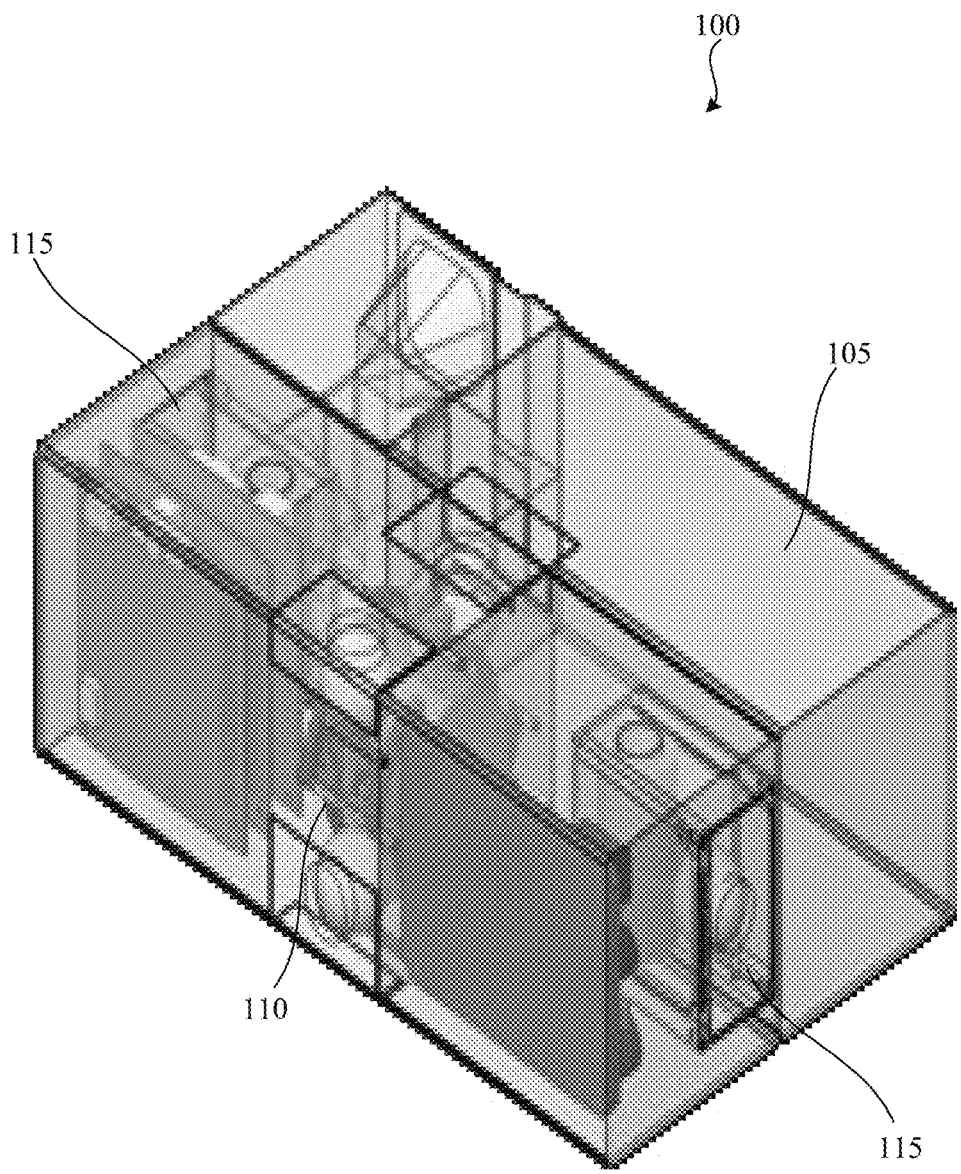
FIG. 1 illustrates a satellite with booms in a stowed configuration according to some embodiments.

FIG. 1 illustrates a satellite 100, which may include a satellite body 105 according to some embodiments. In some embodiments, the satellite 100 may include a plurality of boom deployment devices such as, for example, a multi-boom deployment device 110 and/or two single-boom deployment devices 115.

In some embodiments, some components of the satellite 100 may be configured to be packaged within a small volume such as, for example, a box or the volume of a satellite body 105. In some embodiments, the satellite body 105 may be configured to include any number of other devices within the volume of the satellite body 105, such as, for example: a 3-axis electric field sensor, a 3D vector electric field instrument, a magnetometer, particle detector, Langmuir probe, an ion drift meter, a flux gate magnetometer, electrostatic analyzer, a propulsion system, a controller, communication systems, or any other desirable device to be housed within the satellite body 105. In some embodiments, spacecraft functionality for the satellite body 105 may be provided by a satellite bus such as the XB-1 Precision Pointing XACT Based satellite bus or any other satellite bus configured to perform functions such as ADCS, C+DH, Power, RF/Comm, GPS or 3-axis stabilized capability.

In some embodiments, various science objectives can be met using multiple satellites in Low Earth Orbit (LEO) that include 3-axis electric field instruments. One such deployment system may include an Electric Potential and Field Instrument for a satellite that can be accommodated in less than half of a 6U satellite. In some embodiments, this may include a deployable composite boom technology with lightweight, stiff, straight, thermally stable booms capable of being stowed within a satellite form factor. In some embodiments, a satellite may include one or more deployable booms with lengths configured to accomplish satellite missions.

In some embodiments, in the stowed configuration two or more booms may be wrapped around the same drum or spool. In some embodiments, each boom may include a slit tube longeron comprising a slit that extends along the longitudinal length of the longeron. In some embodiments, the longeron may be flattened and/or rolled along the longitudinal length of the longeron such as, for example, for stowage. In some embodiments, the longeron may include teeth along the length of the slit such that the teeth can join together after deployment.

Figure 2:
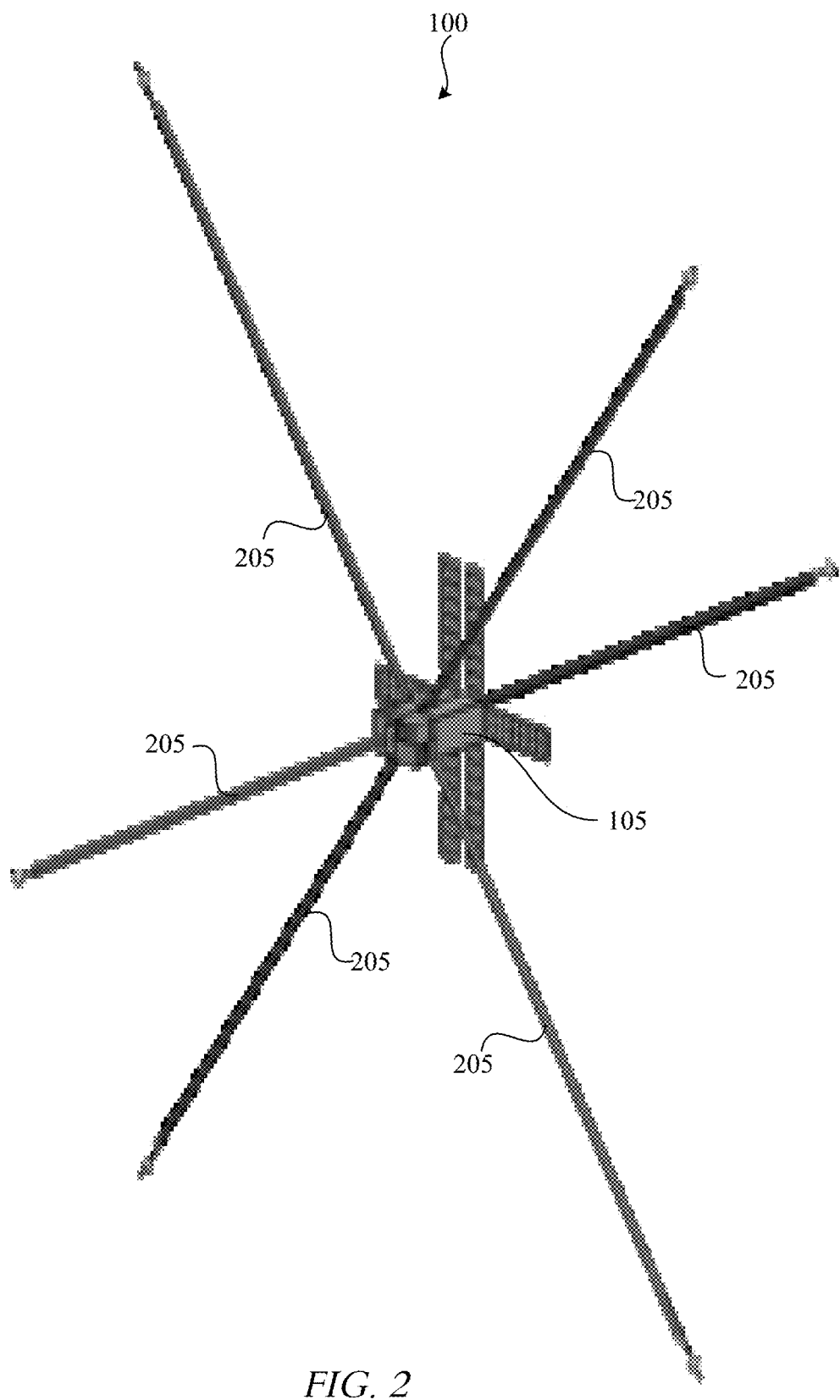
FIG. 2 illustrates a satellite with booms in a deployed configuration according to some embodiments.

FIG. 2 illustrates a satellite 100 with booms 205 deployed. The satellite 100 may include internal electronics and spherical sensors mounted on long rigid graphite composite booms coupled with the booms 205. In some embodiments, such sensors may be configured to form three orthogonal dipoles or to act individually depending upon the desired measurement mode. The booms 205 may be composed of a sufficiently rigid material, such as graphite for example, that enables the instrument to be accommodated on a multi-axis stabilized satellite platform. In some embodiments the booms 205 may be configured to form any number of dipole lengths such as 4 m, 5 m, or any other length. Additionally, the booms 205 may be configured to be deployable and retractable. The satellite 100 may include any number of booms 205.

Figure 3:
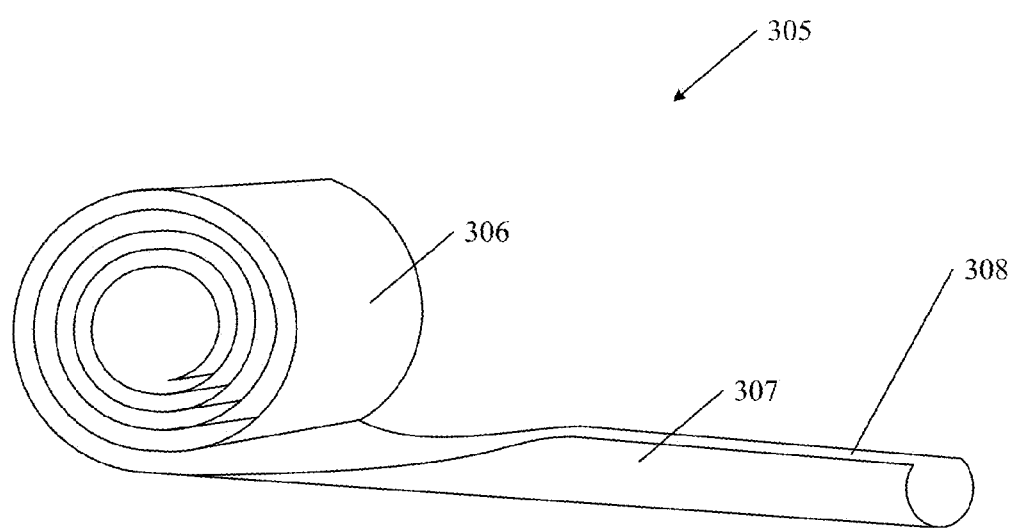
FIG. 3 illustrates an example boom according to some embodiments.

FIG. 3 illustrates an example boom 305 according to some embodiments. The boom 305 can be flattened and rolled for stowage and then regain its original, unflattened, circular, elliptical, or semi-circular cross-section during deployment. The boom 305 may include a long tube with one or more slits 308 or gaps that extend through all or a portion of the longitudinal length of the boom 305. The boom 305 may include a hollow interior. The slit 308 may allow the boom 305 to be flattened and rolled into a stowed or rolled configuration or extended in a deployed configuration. When rolled, various different booms may be stacked, nested, aligned and/or combined and collectively rolled together. The boom 305 may be constructed from any type of material that may, for example, include metal, graphite, fiber, resins, shape memory materials, composite materials, polymers, etc. In some embodiments, the boom 305 may be constructed from a composite material with a number of plies embedded with a resin.

The boom 305 may have a tubular shape in the deployed configuration and flattened and rolled in the stowed configuration. When rolling a boom 305, the tubular cross-section of the boom 305 can be flattened and/or the boom 305 may be opened along the longitudinal length of the boom 305. The boom 305 can then be rolled into a stowed configuration. In some embodiments, during stowage, portions of the boom 305 may be progressively flattened as the boom 305 is rolled up. In some embodiments, multiple booms can be stacked upon one another, nested or embedded within each other in the tubular or deployed configuration. The combined boom stack can then be rolled along the longitudinal length of the booms into the stowed configuration.

In some embodiments, the boom 305 may include more than one slit along the longitudinal length of the boom 305.

Figure 4:
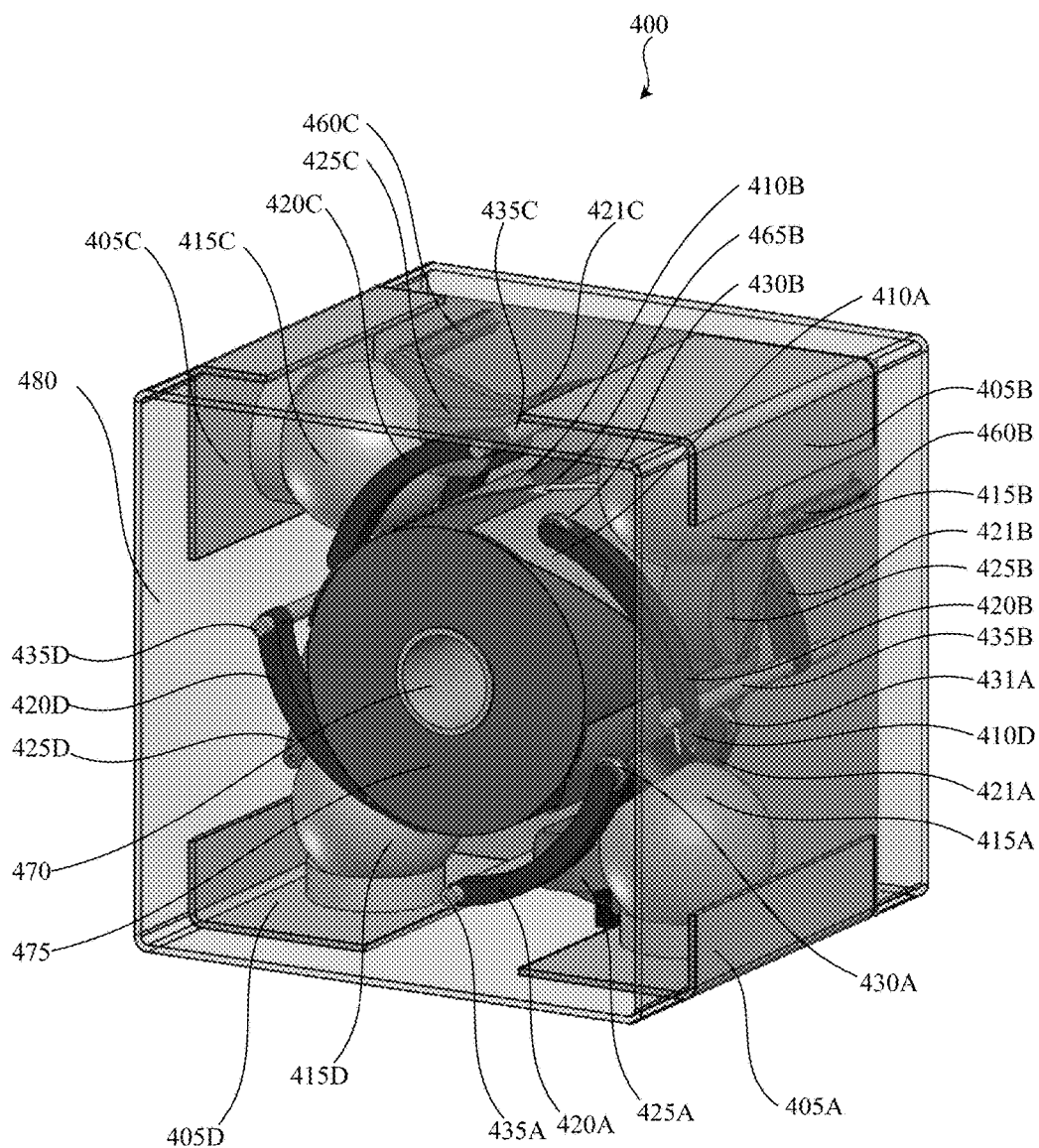
FIG. 4 illustrates a multi-boom deployment device in a stowed configuration according to some embodiments.

FIG. 4 illustrates a multi-boom deployment device 400 in a stowed configuration according to some embodiments. The multi-boom deployment device 400 may include stow and/or deploy any plurality of booms such as, for example, two, three, four, five, six, seven, etc. booms.

The multi-boom deployment device 400 shown in FIG. 4 includes four booms flattened and rolled about a spool 470. The four booms in this example include boom 410A, boom 410B, boom 410C, and boom 410D (collectively and/or individually boom 410). The booms 410 in the stowed configuration comprise flattened and wound booms 475 that are wound about the spool 47o. Each boom 410 may, for example, be similar to boom 305 and/or may include the characteristics and/or properties of boom 305.

In some embodiments, the spool 470 may include a motor such as, for example, a stepper motor (e.g., the Faulhaber AM 0820 or the like). In some embodiments, the motor may be disposed within the interior of the spool 470. In some embodiments, the motor may be used to drive out the boom 410.

In some embodiments, the boom 410 may include any of a variety of deployable composite booms that range from 12.7 mm (0.5") to 203 mm (8.0") diameter and up to 23 H meters (75-ft) in length. In some embodiments, the boom 410 may also include slit-tube composite boom that can be flattened and rolled around the spool 470 for storage. Some embodiments may include a boom 410 configured to be 1.5 m long, with a 19 mm diameter motor-driven boom 410 that may take up less than 50% of a 1U satellite volume and weighs less than 200 g.

In some embodiments, the boom 410 may be rotated using strain energy stored in one or more of the booms. For example, while the booms 410 are being flattened and rolled into the stowed configuration strain energy is introduced into the booms 410. The strain energy, for example, can provide a bias in the booms toward the deployed state. Thus, when a restraint mechanism holding the booms in place is released, the strain energy in the booms 410 will cause the booms to unroll and deploy. Various other mechanisms may be used to unroll the booms 410 on the spool 470.

In some embodiments, the boom 410 may be configured to survive the mechanical strain of being wrapped around the spool 470, while also having sufficient axial stiffness and a coefficient of thermal expansion ("CTE"), allowing for tip stability in a typical on-orbit environment. In some embodiments, the size of the boom 410 and the sensor 415 may be configured to reduce shadowing and influences on electric field detection.

In some embodiments, the boom 410 may be configured to be sufficiently long and narrow as to reduce the influence of the satellite 100 on a DC e-field vector measurement.

The booms 410 may be stowed within housing 480. The housing 480 may comprise any geometric shape and/or may have any size configured to stow and/or deploy the booms 410. In this example, the housing comprise a roughly cube shape. In some embodiments, the housing may be disposed within a satellite or other body.

In some embodiments, each boom 410 may be coupled with a corresponding boom wire 465 (e.g., boom wire 465A, boom wire 465B, boom wire 465C, and/or boom wire 465C collectively and/or individually boom wire 465) and/or a corresponding sensor 415 (e.g., sensor 415A, sensor 415B, sensor 415C, and/or sensor 415C collectively and/or individually sensor 415). The boom wire 465 may include any type of wire such as, for example, wire that can communicate sensor data or signals from the sensor 415 to data sampling device. In some embodiments, the sensor 415 may include an electric field sensor, a magnetic field sensor, a temperature sensor, etc.

The housing 480 may include a plurality of restraint mechanisms 405 (e.g., restraint mechanism 405A, restraint mechanism 405B, restraint mechanism 405C, and/or restraint mechanism 405C collectively and/or restraint mechanism 405).

Figure 5:
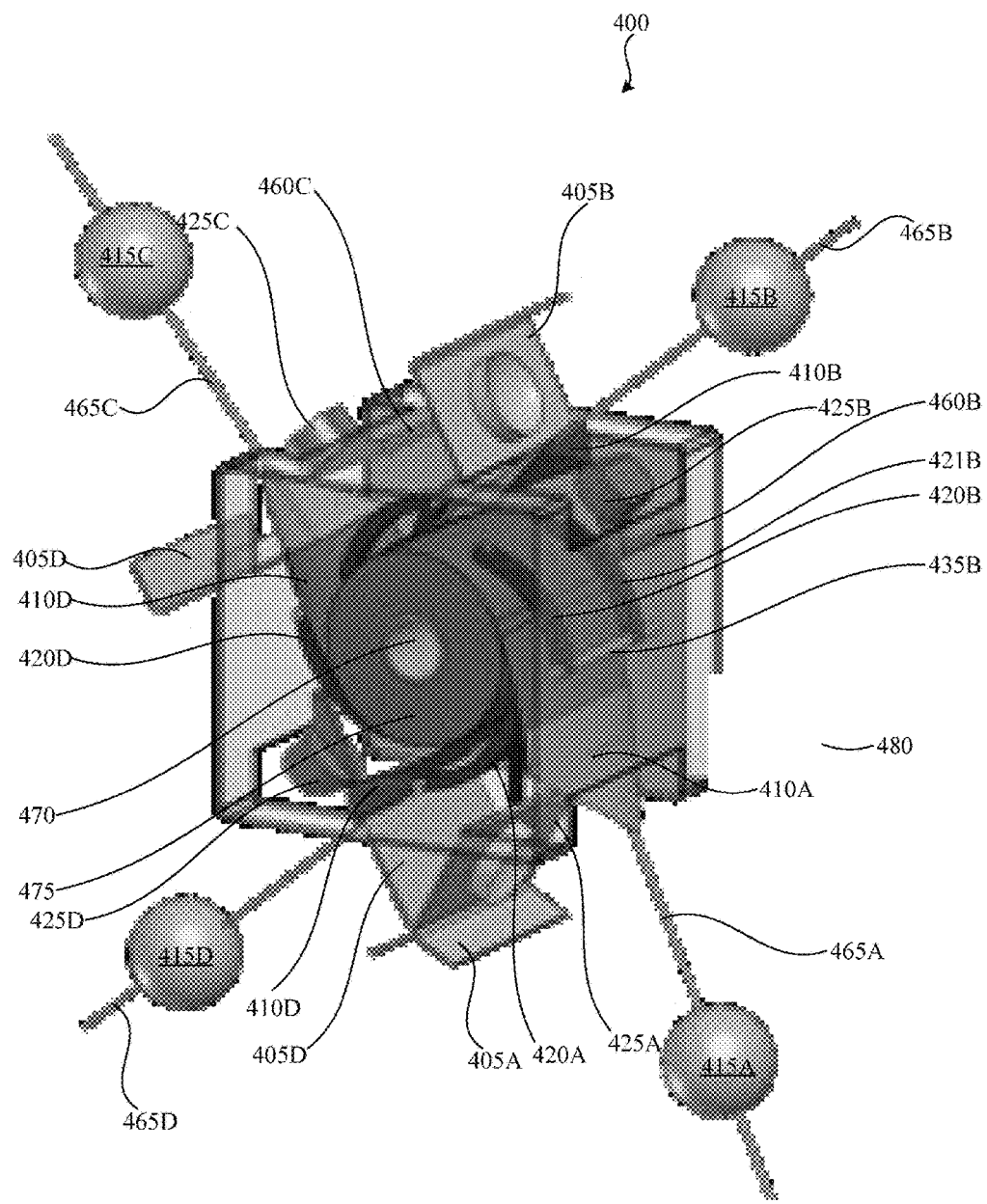
FIG. 5 illustrates a multi-boom deployment device in a partially-deployed configuration according to some embodiments.

In some embodiments, the restraint mechanisms 405 may be spring loaded so that when an electric release on the restraint mechanisms 405 is activated, the restraint mechanisms may spring open as shown in FIG. 5. Each boom 410 may disposed near, include, and/or be associated with a corresponding restraint mechanism 405 such that the boom 410 may deployed through the corresponding restraint mechanism 405 during deployment. The restraint mechanism 405 may include a spring loaded device held closed with any number of simple release devices, such as a burn wire. The restraint mechanism 405 may be further configured to be released by a single command from the satellite 100. The restraint mechanism may then be configured to pop open. In some embodiments, the sensor 415 may be configured to be released once the restraint mechanism 405 has opened. In some embodiments, embodiments the restraint mechanism may include a strap, cord, wire, latch, release, clamp, etc.

In the example shown in FIG. 4, the restraint mechanism 405 comprises a door. In the stowed configuration, for example, the door may be closed. The closed doors, for example, may secure the boom 410 within the housing. In some embodiments, the restraint mechanisms 405 may include a socket that is sized and/or configured to couple with the sensor 415, for example, to secure the sensor while in the stowed configuration.

In some embodiments, the multi-boom deployment device 400 may include a boom deployment guide that includes a first boom guide arm 420 (first boom guide arm 420A, first boom guide arm 420B, first boom guide arm 420C, and/or first boom guide arm 420D collectively and/or individually first boom guide arm 420), a second boom guide arm 421 (second boom guide arm 421A, second boom guide arm 421B, second boom guide arm 421C, and/or second boom guide arm 421D collectively and/or individually first boom guide arm 421), and/or a boom guide cross member 435 (e.g., boom guide cross member 435A, boom guide cross member 435B, boom guide cross member 435C, and/or boom guide cross member 435D collectively and/or individually boom guide cross member 435). The boom guide arm 420 and/or the boom guide arm 421 may be biased toward the flattened and wound booms 475 on the spool 470. In some embodiments, each of the boom deployment guides may include a plurality of rollers or wheels such as, for example, a first wheel 430 (e.g., first wheel 430A, first wheel 430B, first wheel 430C, and/or first wheel 430D collectively and/or individually first wheel 430) and/or a second wheel 431 (e.g., second wheel 431A, second wheel 431B, second wheel 431C, and/or second wheel 431D collectively and/or individually second wheel 431). In some embodiments, the boom deployment guides may guide a corresponding boom toward an exit aperture of the housing 480 during deployment.

Figure 7:
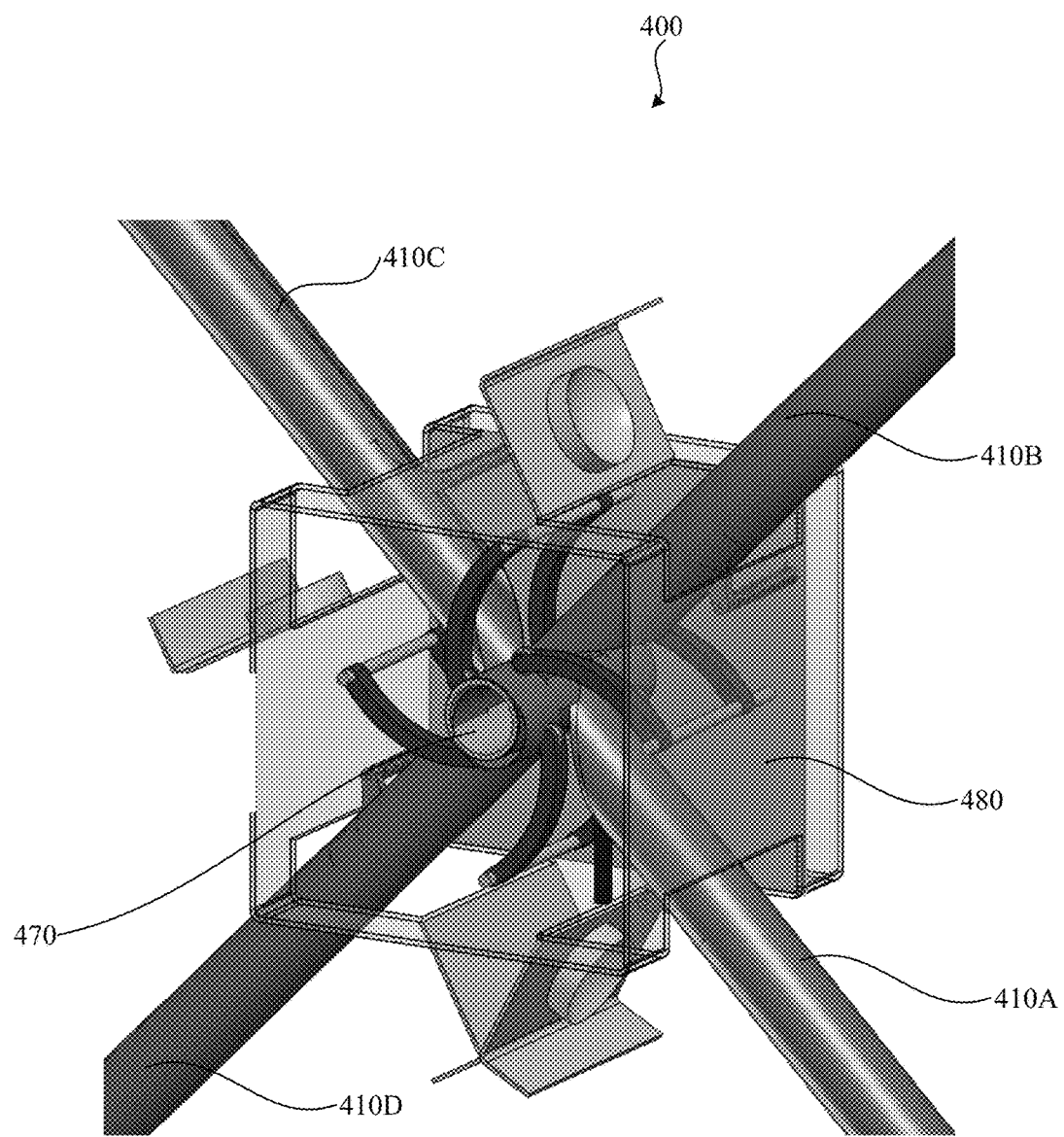
FIG. 7 illustrates a multi-boom deployment device in a deployed configuration according to some embodiments.

In some embodiments, the multi-boom deployment device 400 may include a plurality of root plugs 425 (e.g., root plugs 425A, root plugs 425B, root plugs 425C, and/or root plugs 425D collectively and/or individually root plugs 425). Each boom 410 may couple with a corresponding root plug 425 after deployment to secure the boom 410 with the housing 480 as shown in FIG. 7. In some embodiments, each root plug 425 may be coupled with a spring mechanism 460. In some embodiments, the spring mechanism 460 (e.g., spring mechanism 460A, spring mechanism 460B, spring mechanism 460C, and/or spring mechanism 460D collectively and/or individually spring mechanism 460) may be coupled with the housing 480. In some embodiments, the spring mechanism 460 may rotate the root plug 425 into a position near the proximal end of the boom 410 so that the proximal end of the boom 410 may wrap around the root plug 425 when deployed and formed into a cylindrical shape in the deployed configuration. In the stowed configuration, for example, the root plug 425 may be positioned away from the spool 470 and/or the flattened and wound booms 475, and/or nearer the interior wall of the housing 480.

FIG. 5 illustrates a multi-boom deployment device 400 in a partially-deployed configuration according to some embodiments. In this configuration, the booms are partially stowed within the housing. For instance, a portion of each boom 410 may still be wrapped around the spool 470. In this example, the restraint mechanisms 405 are open as shown in the figure. When the restraint mechanisms open an aperture in the housing 480 is opened through which each of the booms maybe deployed. In this example, each of the four booms are beginning to exit the housing 480 through the apertures. Also, in this configuration, the sensors 415 and/or the boom wires 465 have exited the housing 480 through the apertures.

The spool 470, in this configuration, has been rotated clockwise to a new angular position in comparison to the angular position of the spool 470 in FIG. 4. This rotation may cause the booms 410 to uncoil from the spool 470 and extend through the apertures in the housing 480. As the booms 410 extend they unflatten and regain their tubular shape. As the booms 410 roll off the spool 470 the distal end for the boom 410 may be directed toward the aperture by the boom deployment guide.

Figure 6:
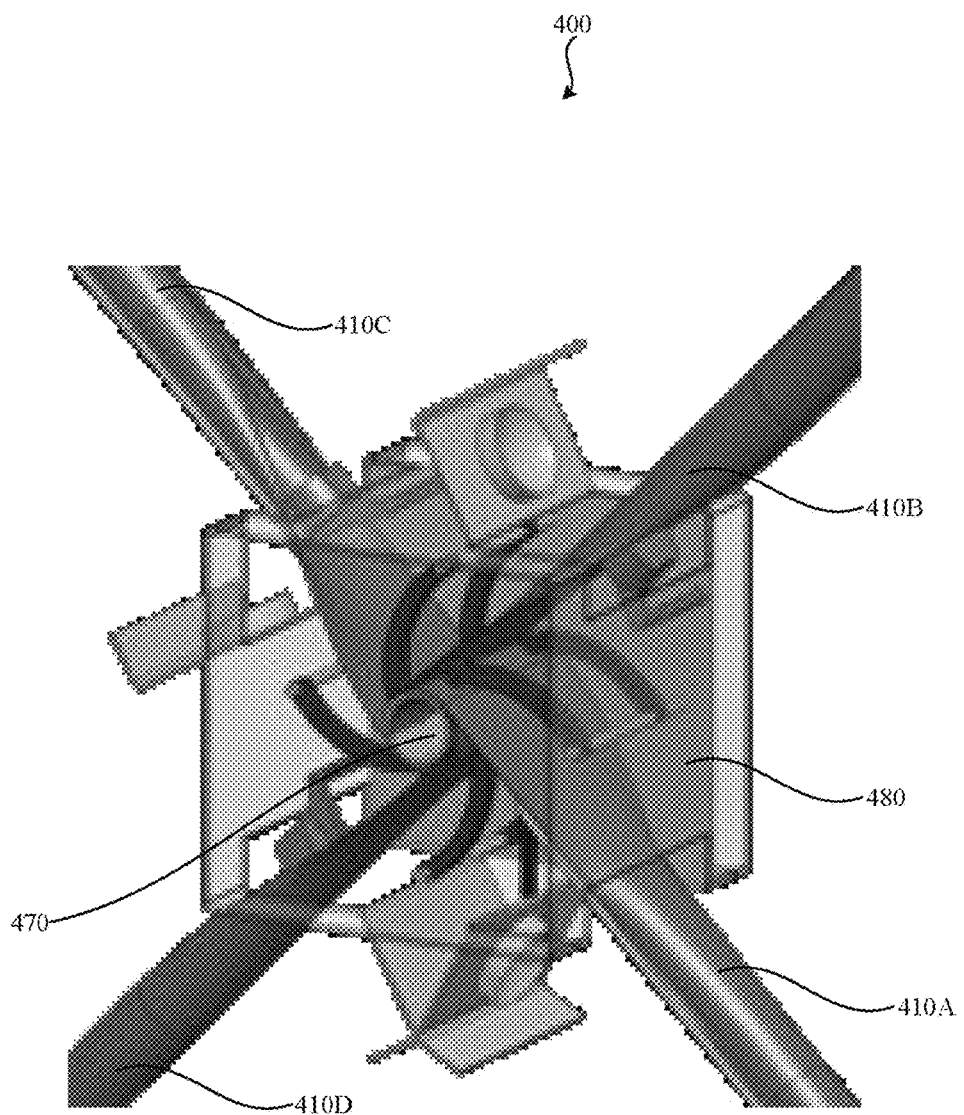
FIG. 6 illustrates a multi-boom deployment device in a mostly-deployed configuration according to some embodiments.

FIG. 6 illustrates a multi-boom deployment device 400 in a mostly-deployed configuration according to some embodiments. In this configuration, the booms 410 are nearly completely deployed or unrolled from the spool 470.

FIG. 7 illustrates a multi-boom deployment device 400 in a deployed configuration according to some embodiments. In this configuration, the booms 410 are unrolled from the spool 470. In some embodiments, the booms 410 may still be coupled with the spool 470 such as, for example, at the proximal end of the booms 410. The proximal end of the boom 410 (e.g., the end of the boom 410 closes to the spool 470) may transition from a flattened state to a tubular state; and each of the proximal ends of the booms 410, for example, may be wrapped around the root plug 425. The root plug 425, for example, may provide structural stability to the proximal end of the boom 410. In some embodiments, the boom 410 may be coupled with the root plug 425 via an additional clamping mechanism that may secure the boom 410 with the root plug 425.

Each of the booms 410 of multi-boom deployment device 400 are shown being deployed at substantially right angles from the two adjacent booms 410. In some embodiments, the booms 410 of the multi-boom deployment device 400 may be configured to deploy at any number of angles, for example at a 45 degree angle with respect to the side of the housing 480. In some embodiments, the booms 410 may be deployed at 90 degrees relative to one another. Alternatively or additionally, any number of booms 410 may be deployed at any number of angles relative to one another such as, for example, two booms, three boom, five booms, six booms, seven booms, eight booms, etc.

At the end of deployment, the spool 470 may be configured to stop against a hard stop and lock in position by the recovered cross section of the boom 410. In embodiments including a regained cross-section, the boom 410 may have increased stiffness and strength near the multi-boom deployment device 400. Such increased strength may also increase the pointing accuracy of a longer and narrower boom 410.

Figure 8:
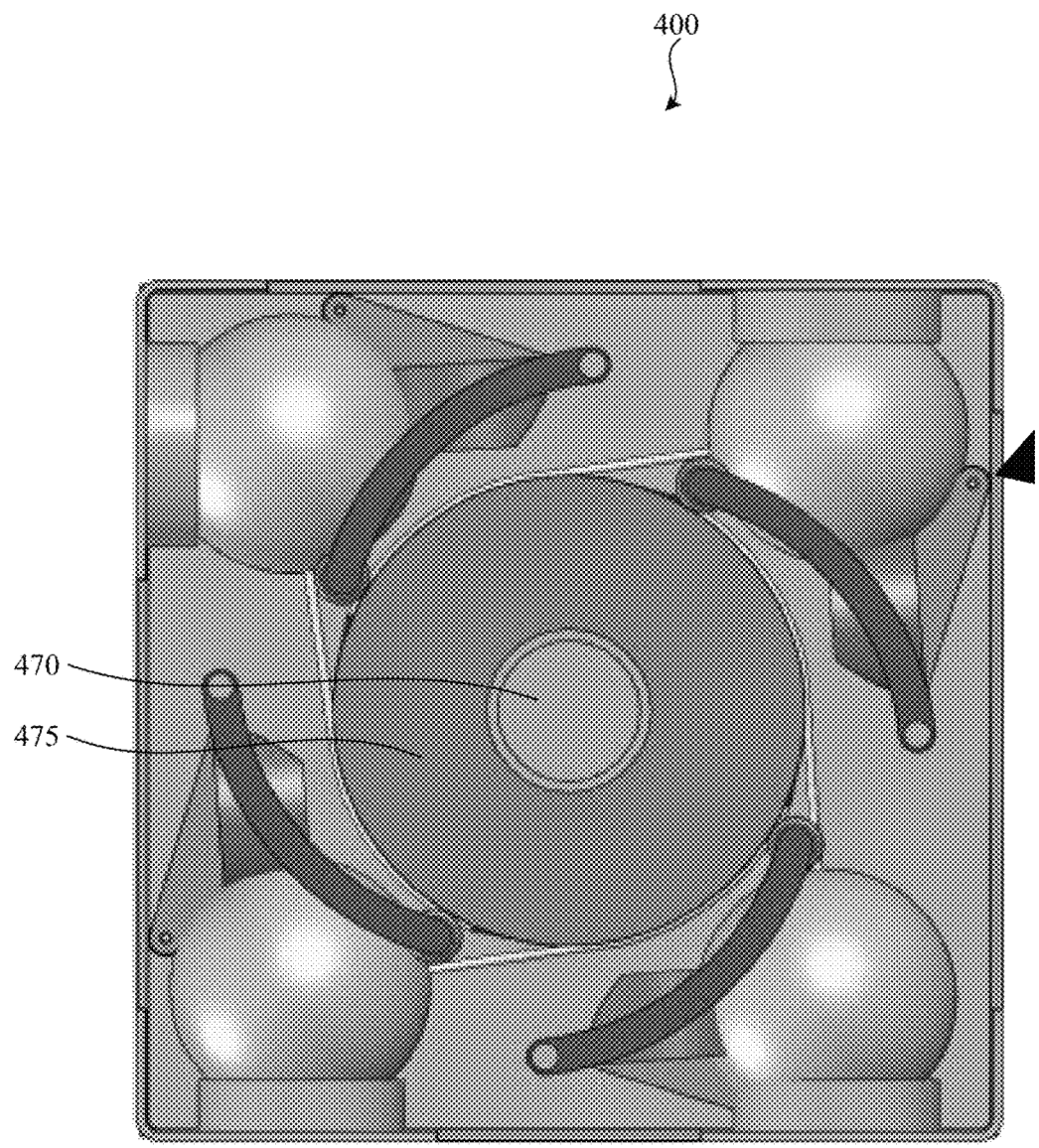
FIG. 8 is a side view of a multi-boom deployment device according to some embodiments.

FIG. 8 is a side view of a multi-boom deployment device 400 according to some embodiments.

Figure 9:
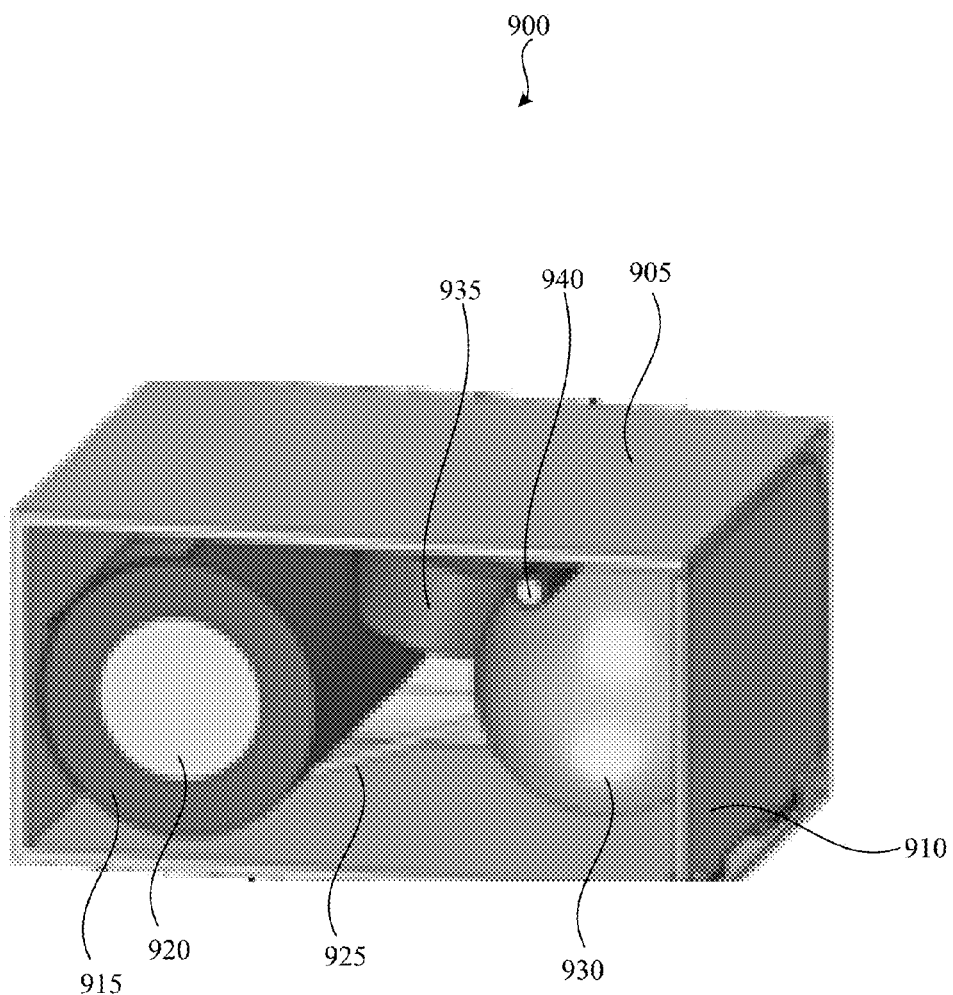
FIG. 9 illustrates a single-boom deployment device in a stowed configuration according to some embodiments.

FIG. 9 illustrates a single-boom deployment device 900 in a stowed configuration according to some embodiments. The single-boom deployment device 900 includes a housing 905 with an openable restraint mechanism 910. A spool 920 is disposed within the housing. A boom 915 is flattened and wrapped around the spool 920. In some embodiments, the boom may be coupled with a sensor 930 and/or a boom wire 925. The sensor 930 may be the same or similar as sensor 415. The boom wire 925 may be the same or similar as the boom wire 465. A root plug 935 may be coupled with the housing with a spring mechanism 940. The spring mechanism 940 may bias the root plug so that the root plug 935 may rotate into a position relative to the boom 915 in the deployed configuration.

Figure 10:
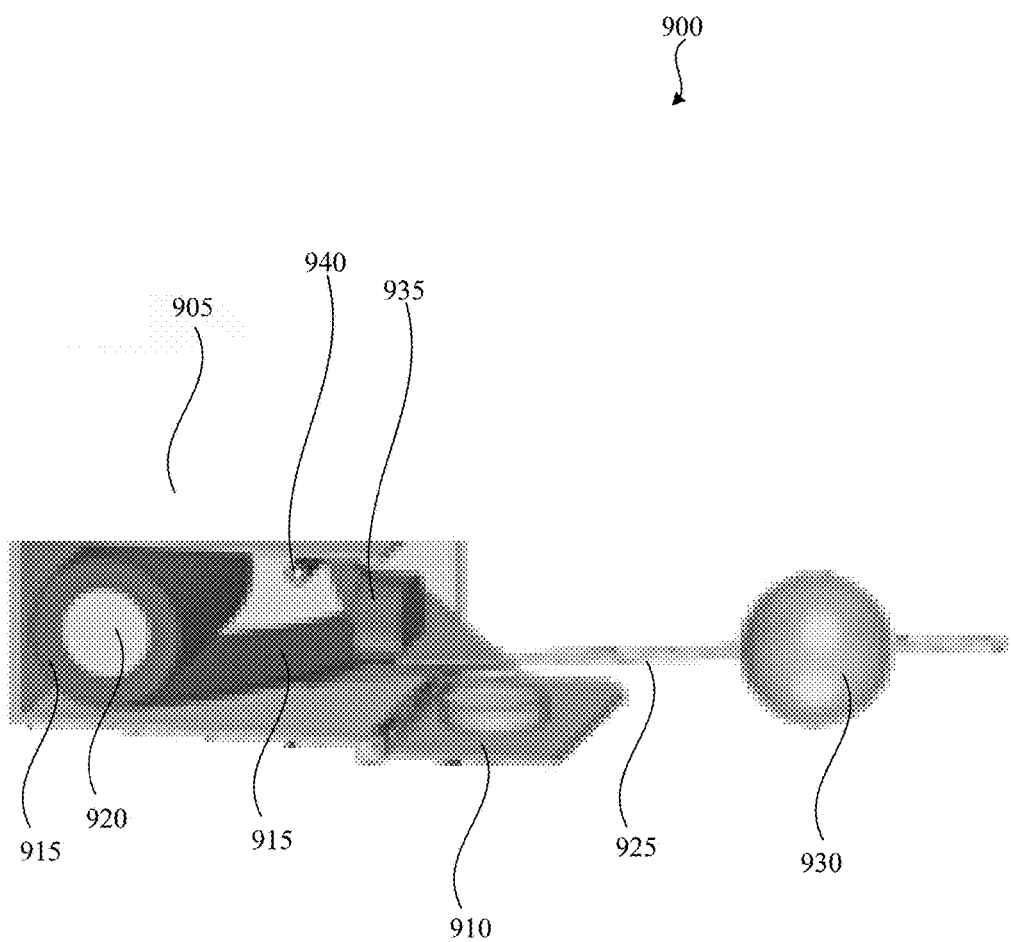
FIG. 10 illustrates a single-boom deployment device in a mostly-stowed configuration according to some embodiments.

FIG. 10 illustrates a single-boom deployment device 900 in a mostly-stowed configuration according to some embodiments. In this configuration, the restraint mechanism 910 has been opened creating an aperture in the housing 905 through which the boom 915 may extend. The spool 920 may rotate counter-clockwise causing the boom 915 to extend. In some embodiments, the root plug 935 may rotate into the deployed position as shown in FIG. 10.

Figure 11:
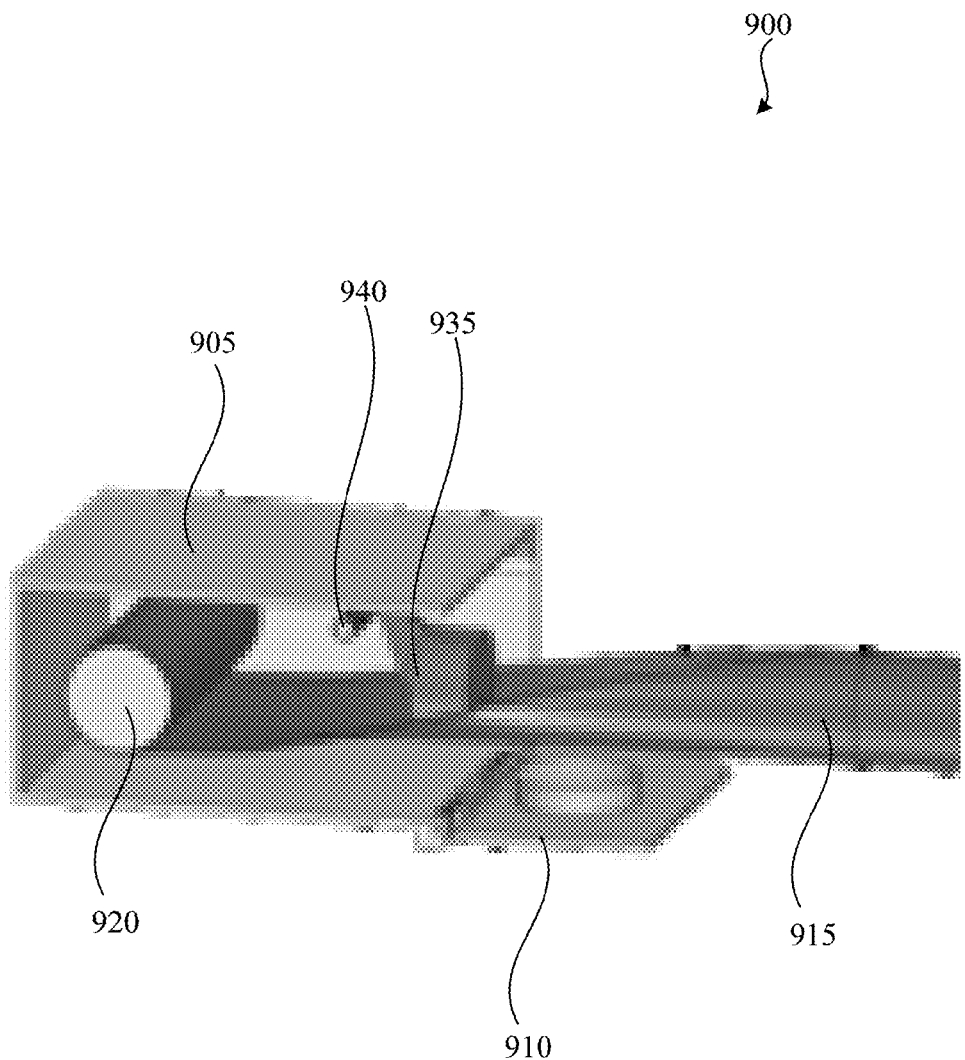
FIG. 11 illustrates a single-boom deployment device in a mostly-deployed configuration according to some embodiments.

FIG. 11 illustrates a single-boom deployment device 900 in a mostly-deployed configuration according to some embodiments. In this configuration, most of the boom 915 has been unwound from the spool 920 and/or deployed. As the boom 915 deploys, it forms into an extended, tubular shape as shown in FIG. 11. The boom 915 deploys as the spool rotates counter-clockwise.

Figure 12:
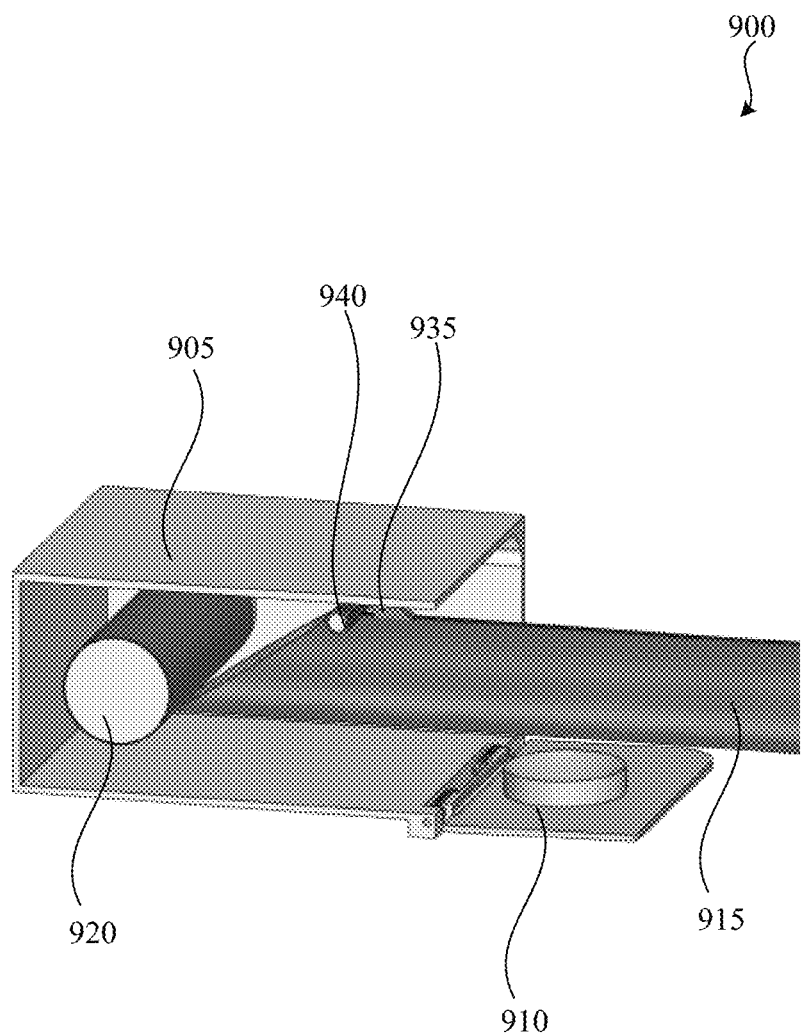
FIG. 12 illustrates a single-boom deployment device in a deployed configuration according to some embodiments.

FIG. 12 illustrates a single-boom deployment device 900 in a deployed configuration according to some embodiments. In the deployed configuration, the proximal end of the boom 915 is wrapped around the root plug 935. The root plug 935 may provide stability to the proximal end of the boom 915. In some embodiments, an additional clamp may be coupled with the boom 915 and/or the root plug 935.

Figure 13A:
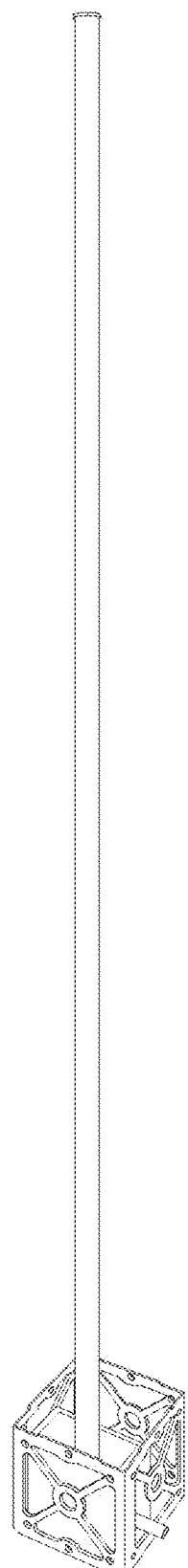
FIG. 13A illustrates a single-boom deployment device in a deployed state.
Figure 13B:
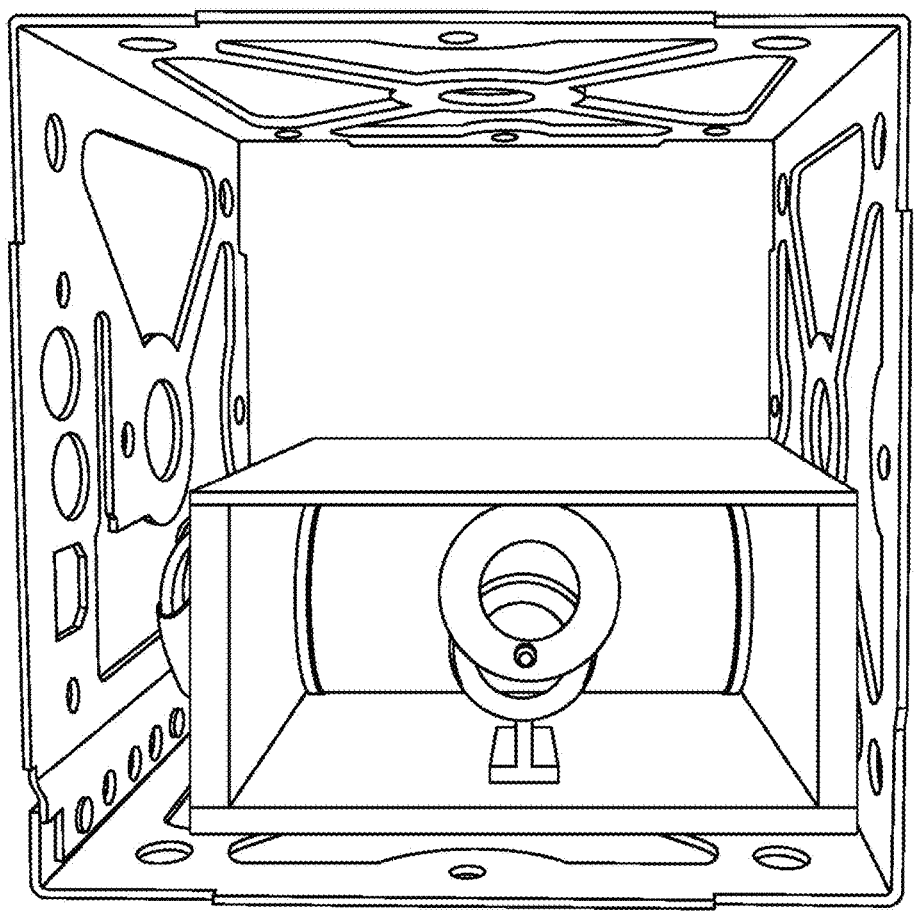
FIG. 13B illustrates a single-boom deployment device in the deployed state.

FIG. 13A illustrates a single-boom deployment device in a deployed state. FIG. 13B illustrates a single-boom deployment device in the deployed state.

Figure 14B:
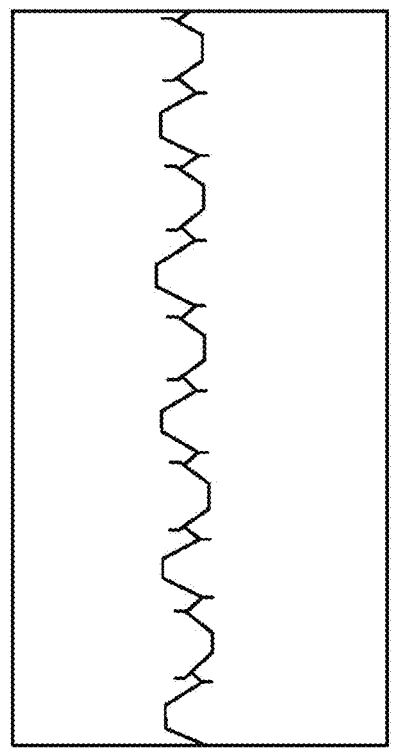
FIG. 14B illustrates the plurality of teeth in a locked configuration.
Figure 14A:
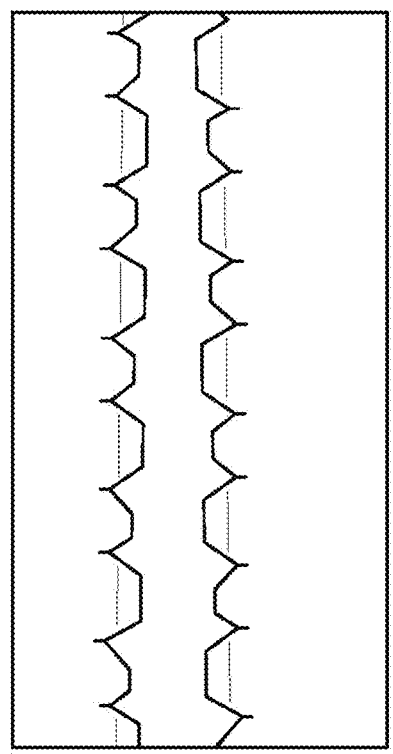
FIG. 14A illustrates a plurality of teeth along the length of the slit in an unlocked configuration.

In some embodiments, a boom may include a slit-lock mechanism that may include teeth formed along both side of the longitudinal length of a slit of the tubular boom. FIG. 14A illustrates a plurality of teeth along the length of the slit in an unlocked configuration. FIG. 14B illustrates the plurality of teeth in a locked configuration. In some embodiments, the slit-lock may improve the stability of the boom when deployed.

Figure 15A:
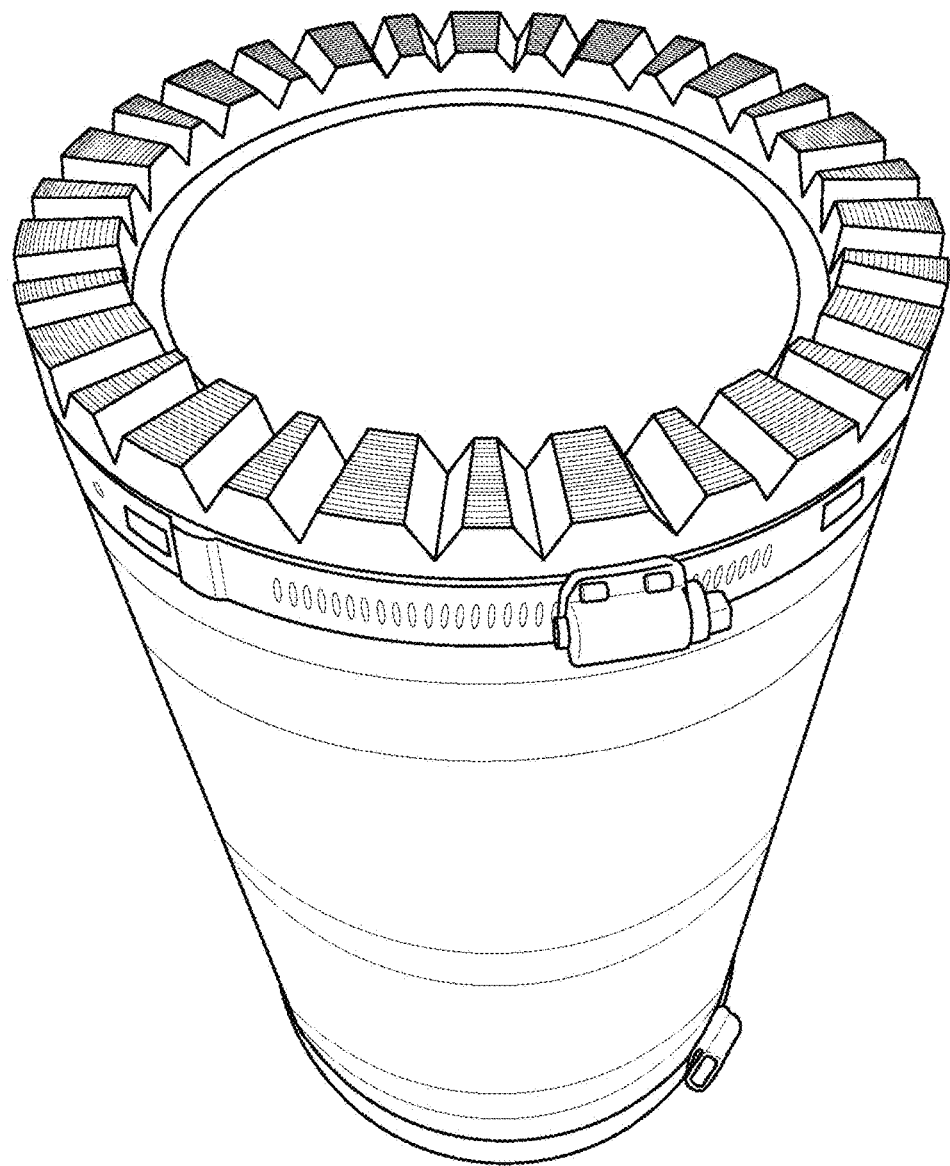
FIG. 15A and FIG. 15B illustrate a slit-lock mechanism according to some embodiments.
Figure 15B:
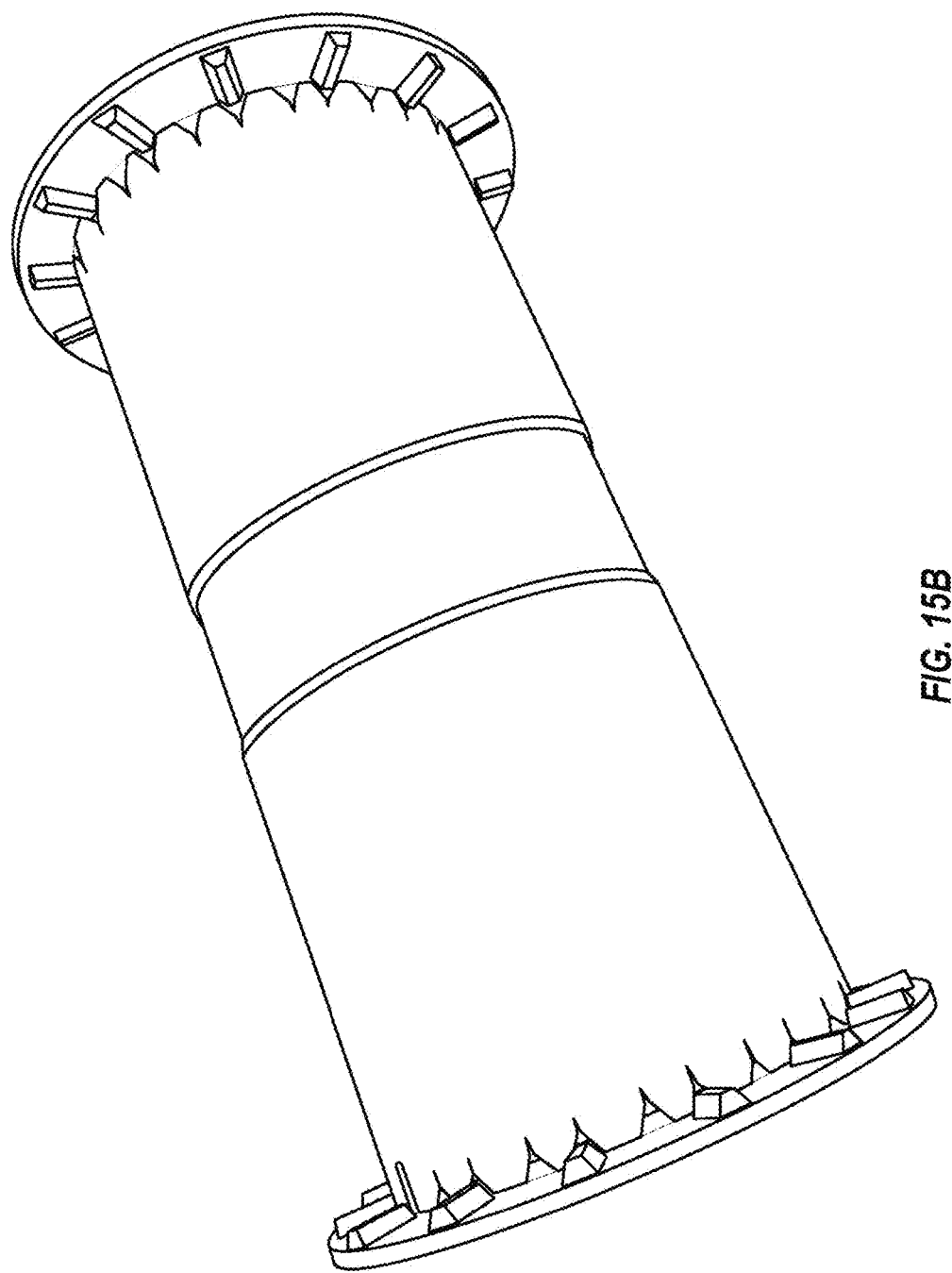

In some embodiments, the teeth on the boom may be aligned with keys on a spool when the boom is stowed with the spool. This alignment may allow the teeth to be engaged to keys on the end caps of a spool as shown in FIG. 15A and FIG. 15B. The slot and key engagement may allow one or more booms to unspool in a controlled manner such as, for example, at precisely the same rate every time. In some embodiments, the engagement between the teeth and the spool may also allow much higher forces to be driven from the spool into the boom as it deploys. In some embodiments, the engagement between the teeth and the spool may allow a significant amount of tension to be driven into the boom or booms during deployment.

Figure 16:
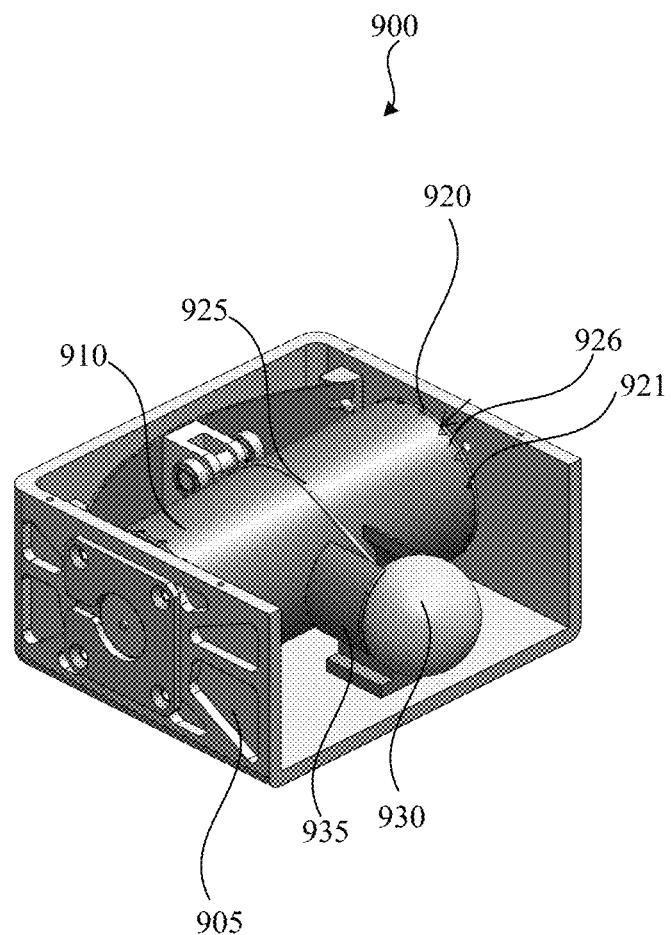
FIG. 16 illustrates a single-boom deployment device in a stowed configuration according to some embodiments.

FIG. 16 illustrates a single-boom deployment device 900 in a stowed configuration according to some embodiments. In this example, the boom 915 includes a plurality of teeth 926 that engage with keys 921 on the spool 920.

Figure 17:
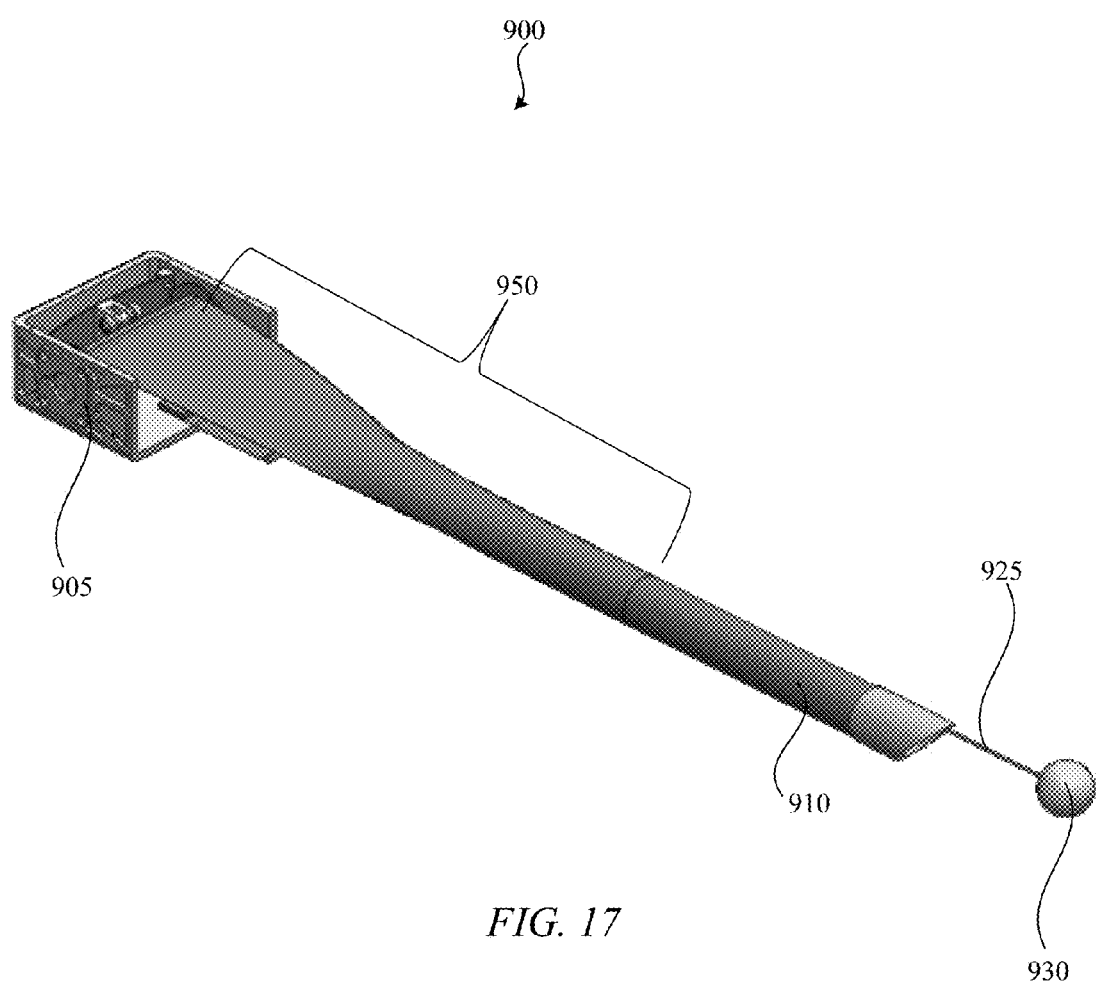
FIG. 17 illustrates the single-boom deployment device in a partially-deployed configuration according to some embodiments.

FIG. 17 illustrates the single-boom deployment device 900 in a partially-deployed configuration according to some embodiments. As the boom 915 deploys from the spool 920, a transition zone is created in the boom 915 that is partially between a flattened boom and a tubular boom. This transition zone can be an area were the boom 915 is less rigid and/or weaker.

Figure 18:
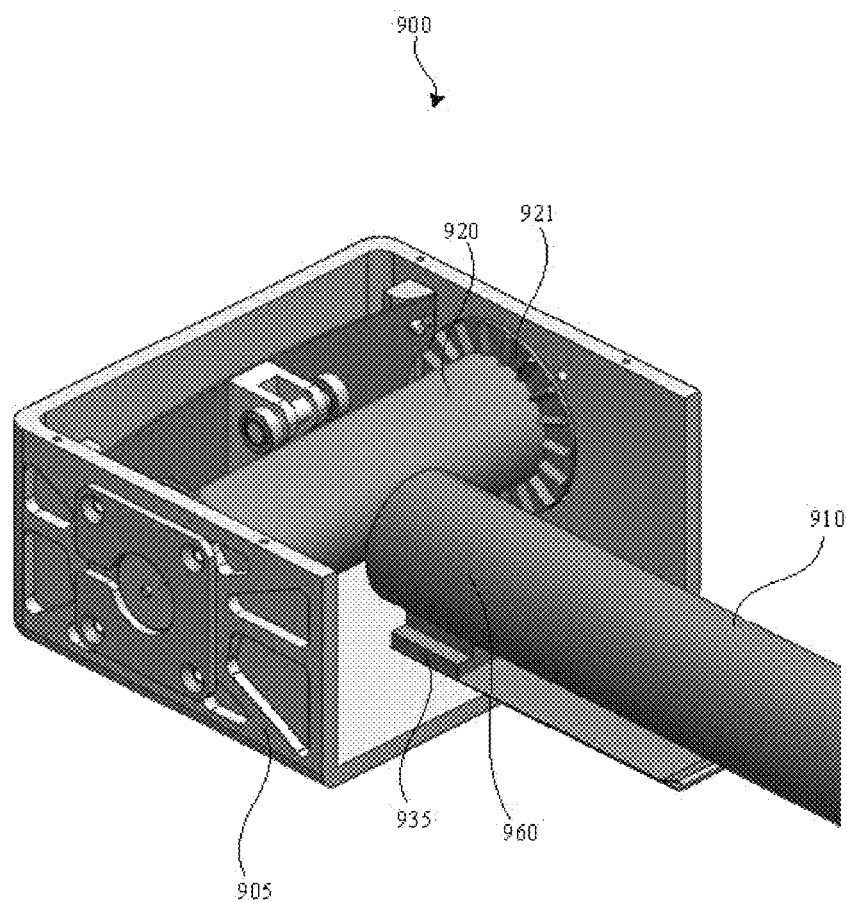
FIG. 18 illustrates the single-boom deployment device in a deployed configuration according to some embodiments.

FIG. 18 illustrates the single-boom deployment device 900 in a deployed configuration according to some embodiments. In the deployed configuration, the proximal end 960 of the boom 915 is wrapped around the root plug 935. As shown in the figure, the spool 920 includes a plurality of keys 921.

Figure 19A:
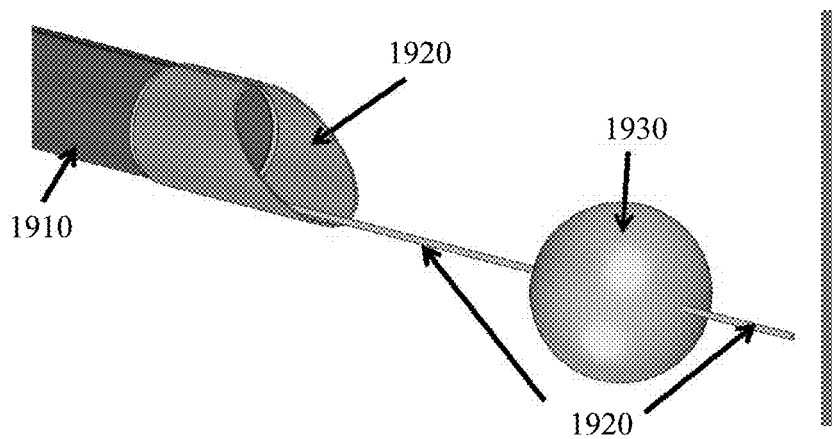
FIG. 19A and FIG. 19B illustrate an example embodiment of a distal end of a boom.
Figure 19B:
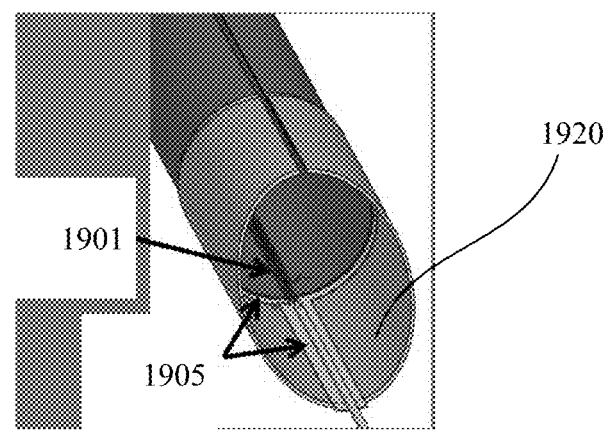

FIG. 19A and FIG. 19B illustrate an example embodiment of a distal end of a boom 1910, which may include similar features as the boom 305, 410, and/or 910. The boom 1910 may include a wire harness 1901. The boom 1910 may be configured to control surface voltage potential across the various components of the boom 1910, which may include a sphere, a guard, a stub, etc. In some embodiments, control of voltage across various surfaces may be accomplished by utilizing an insulating layer 1905 on the boom 1910, such as polymer scrim at each bondline.

The wire harness 1901 may be configured to be bonded to the inside of the boom 1910 and roll up with the boom 1910 upon deployment and retraction. The wire harness 1901 may include the ability to accommodate storage/deployment cycles. In some embodiments, the wire harness 1901 may be routed through the boom 1910 from the internal electronics to the tip of the boom 1910, such that electrical connectivity to the controlled surfaces may be achieved with a wire harness 1901. In some embodiments the wire harness 1901 may be a ribbon cable consisting of a plurality of small gauge wires (36-40 awg). In some embodiments, the wire harness 1901 may be a flat flex circuit.

In some embodiments, the boom 1910 may include a conductive surface 1920 on the outermost portion of the boom and include an attachment point for electrical connection to the wire harness 1901. The conductive surface 1920 may be atomic oxygen resistant, such as, for example, gold, TiN, or AltiN. In some embodiments, the conductive surface 1920 may be a surface treatment or a bulk conductor. Embodiments including a surface treatment may include the application of a thin TiN coating. Such embodiments may apply conductive coatings at relatively low temperatures.

Some embodiments may include the application of a bulk conductor to the tip of the boom 1910 as the conductive surface 1920. For example, the conductive surface 1920 may be a thin section of stainless steel bonded to the tip of the boom 1910.

In some situations, measurements such as, for example, DC e-field measurements can be influenced by the geometry and design of a satellite and the sensor 415 location. The electrostatic charge of the spacecraft creates a disturbance in the electric field that may be subtracted from the measurement. Therefore, reducing the influence of the spacecraft is desired to obtain more accurate measurements. In some embodiments, this may be done by moving the electric field sensor away from the spacecraft body. In some embodiments, the deployable structure itself may also disturb the electric field.

In some embodiments a long and narrow boom may reduce the influence of the boom on an electric field sensor. However, some embodiments may include the boom configured with deployed stiffness, natural frequency, and pointing stability sufficient to reduce influence on an electric field sensor. Some embodiments may include a boom configured to be 2 m long with a deployed diameter that is less than 20 mm.

In some embodiments a boom may be configured to have a greater deployed stiffness than typical satellite appendages, such as carpenter's tape springs or conventional slit-tube beams. For example, a boom may include a stability of 1 degree between orthogonal pairs. In some embodiments, a boom may include locking edge features between lateral edges of the boom, sufficient to increase deployed stiffness and improving stability in both bending and torsion.

Figure 20:
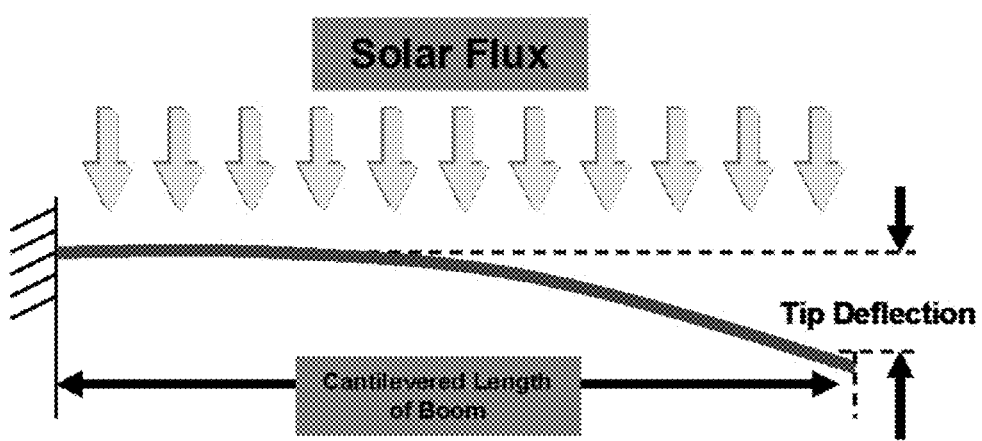
FIG. 20 illustrates the relationship between the solar flux incident along a boom and the resulting "thermal bending" on the boom according to some embodiments.

Some embodiments may include compositions configured to increase thermal stability, which may increase instrument performance. For example, solar flux along the boom may result in a temperature gradient across a section of a boom, resulting in increased "thermal bending", as illustrated in FIG. 20. This phenomenon famously induced "thermal flutter" in the stainless steel slit-tubes of the 1st generation Hubble solar arrays. However, embodiments of the boom 410 may include materials, such as graphite composite, configured to have a reduced CTE, increasing the pointing accuracy in large on-orbit thermal gradients. In some embodiments, the boom 410 may be configured to experience less than a 0.1 degree pointing shift as a result of thermal bending.

In some embodiments the boom 410 and the sensor 415 may be configured to have a first natural frequency of about 2 Hz.

Modifications may be made without changing the scope of the disclosure. Additional embodiments may also include a magnetometer boom configured as particle or field sensors that separate from a spacecraft. Additional embodiments may include a canisterized boom configured to be used as a gravity gradient boom, or as a deployable structure to support solar arrays, solar sails, antennas, or drag sails. The components and features discussed in the disclosure may be configured to function at temperatures from 4 K to 500 K.

The term "substantially" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. A boom deployment system comprising:
    a housing;
    a first spool disposed within the housing;
    a first boom having a proximal end, a distal end, and a cylindrical shape extending in a first direction out of the housing in a deployed configuration, a flattened shape in a stowed configuration, and a slit that extends along a longitudinal length of the first boom in the deployed configuration, wherein the first boom is stowed in the stowed configuration flattened and wrapped around the first spool, wherein the distal end of the first boom comprises a first sensor;
    a second boom having a proximal end, a distal end, and a cylindrical shape extending in a second direction out of the housing at an angle offset from the first boom in a deployed configuration, a flattened shape in a stowed configuration, and a slit that extends along a longitudinal length of the second boom in the deployed configuration, wherein the second boom is stowed in the stowed configuration flattened and wrapped around the first spool, wherein the distal end of the second boom comprises a second sensor;
    a third boom having a proximal end, a distal end, and a cylindrical shape extending in a third direction out of the housing at an angle offset from the first boom and the second boom in a deployed configuration, a flattened shape in a stowed configuration, and a slit that extends along a longitudinal length of the third boom in the deployed configuration, wherein the third boom is stowed in the stowed configuration flattened and wrapped around the first spool, wherein the distal end of the third boom comprises a third sensor; and
    a fourth boom having a proximal end, a distal end, and a cylindrical shape extending in a fourth direction out of the housing at an angle offset from the first boom, the second boom, and the third boom in a deployed configuration, a flattened shape in a stowed configuration, and a slit that extends along a longitudinal length of the fourth boom in the deployed configuration, wherein the fourth boom is stowed in the stowed configuration flattened and wrapped around the first spool, wherein the distal end of the fourth boom comprises a fourth sensor.

2. The boom deployment system according to claim 1, further comprising a restraint mechanism configured to cover the aperture in the stowed configuration and open in the deployed configuration.

3. The boom deployment system according to claim 1, further comprising:
a first root lock disposed within the housing, wherein the root lock is position within the housing relative to the spool, wherein in the deployed configuration a proximal end of the first boom is wrapped around the root lock.

4. The boom deployment system according to claim 3, further comprising a spring mechanism coupled with the housing and the first root lock, wherein the spring mechanism is configured to move the root lock from a location in the stowed configuration into a position near the spool in the deployed configuration.

5. The boom deployment system according to claim 1, wherein the first boom and one or more of the second boom, the third boom, and the fourth boom are substantially orthogonal in the deployed configuration.

6. The boom deployment system according to claim 1, wherein the first boom transitions from the stowed configuration to the deployed configuration as the spool rotates around an axis, and wherein the second boom transitions from the stowed configuration to the deployed configuration as the spool rotates around an axis.

7. The boom deployment system according to claim 1, further comprising:
a housing, wherein the first spool is disposed within the housing;
a second spool disposed within the housing; and
a fifth boom having a cylindrical shape in a deployed configuration, a flattened shape in a stowed configuration, and a slit that extends along a longitudinal length of the boom in the deployed configuration, wherein the fifth boom is stowed in the stowed configuration flattened and wrapped around the second spool.

8. A boom deployment system comprising:
a housing having a first aperture and a second aperture, the second aperture being offset from the first aperture;
a spool disposed within the housing and configured to rotate around an axis that is fixed relative to the housing; and
a first boom having a proximal end, a distal end, and a cylindrical shape extending in a first direction out of the first aperture in the housing at an angle offset from the first boom in a deployed configuration, wherein the proximal end of the first boom is coupled with the spool, wherein the first boom has a flattened shape in a stowed configuration, and a slit that extends along a longitudinal length of the first boom in the deployed configuration, wherein the first boom is stowed in the stowed configuration flattened and wrapped around the spool, the first boom transitions from the stowed configuration to the deployed configuration as the spool rotates around the axis, wherein the distal end of the first boom comprises a first sensor; and
a second boom having a proximal end, a distal end, and a cylindrical shape extending in a second direction out of the second aperture of the housing in a deployed configuration, wherein the proximal end of the second boom is coupled with the spool, wherein the second boom has a flattened shape in a stowed configuration, and a slit that extends along a longitudinal length of the second boom in the deployed configuration, wherein the second boom is stowed in the stowed configuration flattened and wrapped around the spool, where in the slit in the second boom faces the same axial direction as the slit in the first boom; the second boom transitions from the stowed configuration to the deployed configuration as the spool rotates around the axis, where in the distal end of the second boom comprises a second sensor.

9. The boom deployment system according to claim 8, further comprising a first sensor coupled with the first boom and a second sensor coupled with the second boom.

10. The boom deployment system according to claim 8, further comprising a first wire coupled with the first boom and a second wire coupled with the second boom.

11. The boom deployment system according to claim 8, wherein in the deployed configuration the first boom is substantially perpendicular with the second boom.

12. The boom deployment system according to claim 8, wherein the housing includes a first aperture through which the first boom extends in the deployed configuration, and wherein the housing includes a second aperture through which the second boom extends in the deployed configuration.

* * * * *